W. PRUETT.

Rotary Pressure Blower.

No. 6,481. Reissued June 8, 1875.

WITNESSES
Franck L. Durand.
C. F. Ewert

By

INVENTOR
William Pruett
Alexander Mason
Attorney

THE GRAPHIC CO. PHOTO-LITH. 39 & 41 PARK PLACE, N.Y.

UNITED STATES PATENT OFFICE.

WILLIAM PRUETT, OF KOKOMO, INDIANA, ASSIGNOR TO TOBIAS L. VARNS AND ANDREW F. DAYHUFF.

IMPROVEMENT IN ROTARY PRESSURE-BLOWERS.

Specification forming part of Letters Patent No. 153,202, dated July 21, 1874; reissue No. 6,481, dated June 8, 1875; application filed May 22, 1875.

*To all whom it may concern:*

Be it known that I, WILLIAM PRUETT, of Kokomo, in the county of Howard and State of Indiana, have invented certain new and useful Improvements in Rotary Pressure-Blowers; and I do hereby declare that the following is a full, clear, and exact description thereof, reference being had to the accompanying drawings, and to the letters of reference marked thereon, which form a part of this specification.

The nature of my invention consists in the construction and arrangement of a rotary pressure-blower, as will be hereinafter more fully set forth.

In order to enable others skilled in the art to which my invention appertains to make and use the same, I will now proceed to describe its construction and operation, referring to the annexed drawing, in which—

Figure 1:
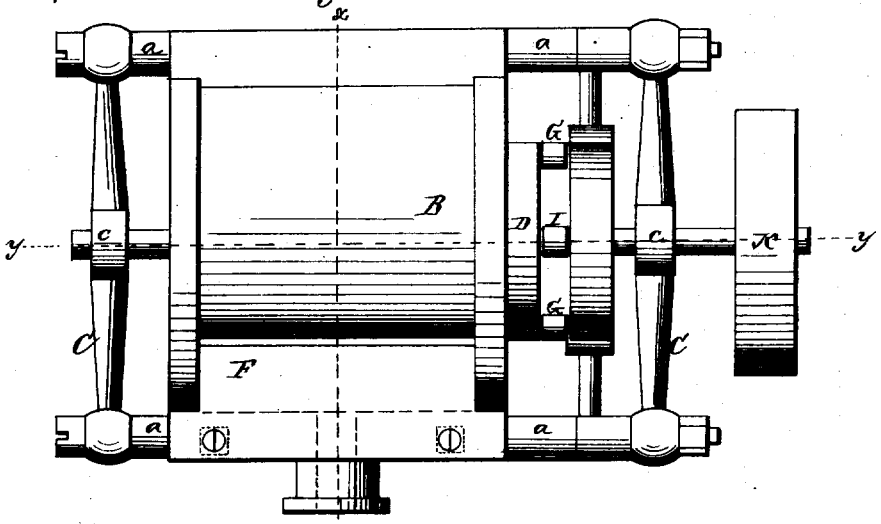
Figure 2:
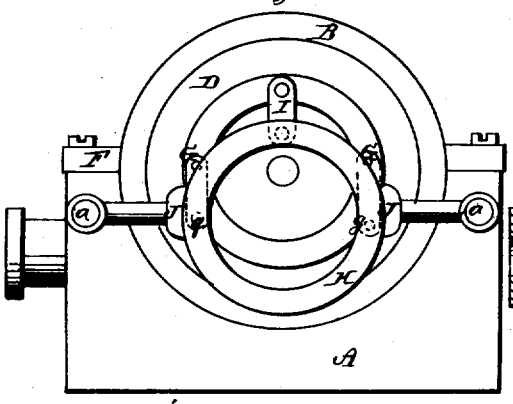
Figure 3:
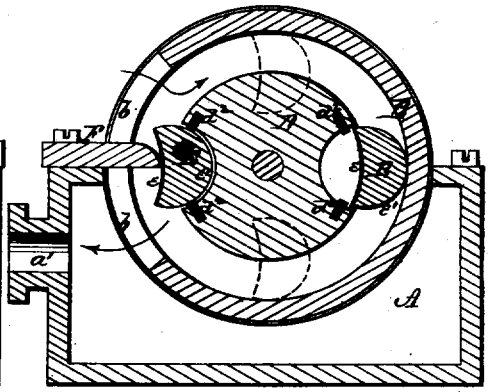
Figure 4:
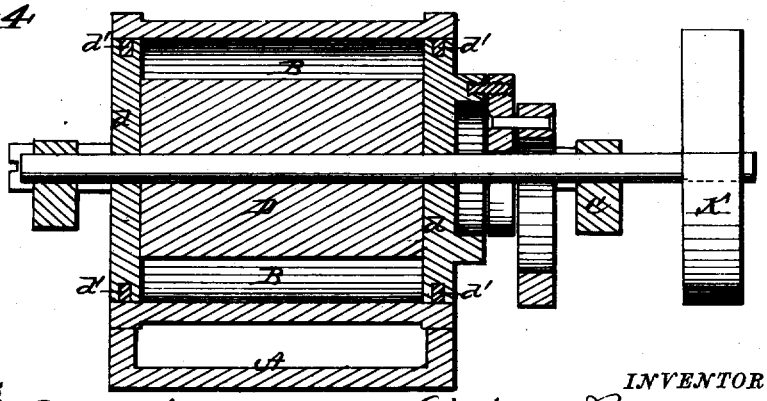

Figure 1 is a plan view of my rotary pressure-blower. Fig. 2 is a side elevation of the same. Fig. 3 is a transverse vertical section through the line *x x*, Fig. 1. Fig. 4 is a longitudinal section on the line *y y*, Fig. 3.

A represents the base of the machine, into which the outside fixed hollow cylinder B is bolted. Four pins or studs, *a a*, project out from the base, to which the cross-bars C C are bolted. These bars form the journal-bearings, *c c*, for the shaft carrying the revolving cylinder D. This cylinder is provided with heads *d d*, rigidly secured to it, closing the space between its periphery and the bore of the cylinder B, and a close joint is made by the metallic packing-rings $d^1$ $d^1$, let into said heads *d d*; or other suitable packing may be used instead. Two revolving crescent-shaped wings, E E, are journaled into, and with their axis slightly within, the periphery of the cylinder D, at an equal distance apart. One side of these wings is concave, as at *e e*, the other convex, as at *e′ e′*. The cavities in the cylinder D, giving room for the wings, are cast in larger than said wings, and are not finished. Small recesses are formed near their edges, as seen at $d^2$, which are afterward filled with any suitable metal, which forms a close-fitting joint with the wings. An adjustable gate or cut-off, F, is screwed to the base A, on a line with the centers of the cylinders B and D, midway through the opening *b* of the former, and just touching the latter and its heads *d d*. The base A is cored out within, as seen in Fig. 3, and is provided with the opening *a′*, leading out from it, forming the exhaust.

The mechanism operating the revolving wings E E is as follows: The journals holding them in position in the heads *d d* project out some distance, to which the connecting-rods G G are permanently fastened. These connecting-rods have their opposite ends journaled to the ring H at *g g*, as seen in Fig. 2, while a third connecting-rod, I, acting only as a steadying-bar, is journaled at both ends, just midway between those marked G G. All these rods are of equal lengths, and are placed parallel with each other, rotating the ring H as the cylinder D revolves. To prevent the ring vibrating, the two concave shoes J J are brought against its periphery, as seen in Fig. 2.

The operation of my invention becomes obvious from the foregoing. Power being applied to the pulley K, a rotary motion is imparted to the cylinder D in the direction indicated by the arrows. In Fig. 3 one of the wings is shown just opposite the gate F. As the cylinder revolves, the concavity of that wing allows it to pass the gate, as it is held parallel with the same. Having passed the gate, the periphery of the cylinder at once takes its place, thus preventing the air below the gate from passing out. As the wing rises in its parallel position, it passes the opening *b*, forcing before it all the air contained between the two wings and the two cylinders. When the first wing has performed its part, the second is in position to begin, and so on alternately.

It will be observed that this machine, although mainly intended as a pressure-blower for air, &c., can be adapted to force water and other liquids. By reversing the order and forcing air or water at its upper opening, the machine will give back a considerable portion of power.

The advantages I claim for my improvement are, the ease with which these blowers may be built, as the work can all be done by a lathe; they are mechanical in construction, not easy to get out of order, and are easily understood and operated.

Having thus fully described my invention, what I claim as new, and desire to secure by Letters Patent, is—

1. The combination, in a rotary pressure-blower, of the revolving wheel or cylinder D, having semicircular recesses on opposite sides, and the revolving wings E E, constructed with one concave side, *e*, and one convex side, *e'*, and placed in the recesses on the cylinder D, a gate or cut-off, and mechanism to communicate the described motion to the wings, substantially as and for the purposes herein set forth.

2. The combination of the recessed revolving cylinder D, the revolving concavo-convex wings E E, and the adjustable gate or cut-off F, substantially as and for the purposes herein set forth.

3. In a rotary blower, the combination of the cylinder B and the cylinder D, with heads *d d*, having circumferential grooves, and the packing-rings $d^1$ $d^1$ therein, all substantially as and for the purposes herein set forth.

4. The combination, with the cylinder D and wings E E, of the connecting-rods G G and I and ring H, for the purposes herein set forth.

5. The combination of the ring H, connecting-rods G G, guiding-rod I, and steadying-shoes J J, as herein set forth.

In testimony that I claim the foregoing I have hereunto set my hand this 17th day of May, 1875.

WM. PRUETT.

Witnesses:
WM. H. H. WHITEHEAD,
S. E. DAYHUFF.